US010251146B2

(12) United States Patent
Blanz et al.

(10) Patent No.: US 10,251,146 B2
(45) Date of Patent: Apr. 2, 2019

(54) APPARATUS AND METHOD FOR NETWORK-INITIATED ATTACHMENT AND REGISTRATION-LESS PAGING

(75) Inventors: Josef J. Blanz, Forst (DE); Gerardo Giaretta, San Diego, CA (US); Haipeng Jin, Carlsbad, CA (US); Serge Willenegger, Onnens (CH); Nathan E. Tenny, Poway, CA (US); Lorenzo Casaccia, Rome (IT); John Wallace Nasielski, San Diego, CA (US); Chennagiri Krishna Subramanaya Pandit, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 12/965,681

(22) Filed: Dec. 10, 2010

(65) Prior Publication Data
US 2011/0140846 A1    Jun. 16, 2011

Related U.S. Application Data

(60) Provisional application No. 61/285,810, filed on Dec. 11, 2009.

(51) Int. Cl.
*G08B 5/22*    (2006.01)
*H04W 60/04*    (2009.01)
(Continued)

(52) U.S. Cl.
CPC ............. *H04W 60/04* (2013.01); *H04W 4/70* (2018.02); *H04W 4/00* (2013.01); *H04W 68/00* (2013.01)

(58) Field of Classification Search
CPC ....... H04W 60/00; H04W 8/00; H04W 60/04; H04W 4/005; H04W 4/00; H04W 68/00;
(Continued)

(56) References Cited

U.S. PATENT DOCUMENTS 5,778,316 A  *  7/1998 Persson ................ H04B 7/2643
                                                                455/434
6,438,375 B1 *  8/2002 Muller .............. H04W 52/0216
                                                                455/435.3
(Continued)

FOREIGN PATENT DOCUMENTS

EP          1235365 A1      8/2002
EP          1850618 A1     10/2007
(Continued)

OTHER PUBLICATIONS

International Search Report and Written Opinion—PCT/US2010/060136—ISA/EPO—Mar. 30, 2011.
(Continued)

*Primary Examiner* — Naomi J Small
(74) *Attorney, Agent, or Firm* — Arent Fox, LLP

(57) ABSTRACT

A method for registration-less paging includes establishing a mobile device identity for a mobile device in a wireless network, determining a time instance for the identified mobile device to listen to pages, and sending a page from the wireless network to the identified mobile device during the determined time instance. In one example, the method is for a network-initiated attach procedure and includes receiving a request to attach a mobile device in a wireless network, generating a paging message based on the request to attach the mobile device, sending a paging indicator to a mobile device based on the paging message during a time instance based on an agreed rule, and accepting an attach procedure from the mobile device based on the paging indicator.

40 Claims, 12 Drawing Sheets

(51) Int. Cl.
*H04W 4/70* (2018.01)
*H04W 4/00* (2018.01)
*H04W 68/00* (2009.01)

(58) Field of Classification Search
CPC ..... H04W 8/005; H04W 12/04; H04W 24/02; H04W 24/08; H04W 28/0215; H04W 28/06; H04W 28/08; H04W 28/16; H04W 40/24; H04W 48/18; H04W 52/0235
USPC ........................................................ 340/7.1
See application file for complete search history.

(56) References Cited

U.S. PATENT DOCUMENTS

| | | | | |
|---|---|---|---|---|
| 7,020,102 | B2* | 3/2006 | Tuomainen | H04W 52/0216 370/311 |
| 7,860,527 | B2 | 12/2010 | Ngai et al. | |
| 8,073,470 | B1* | 12/2011 | Collins | H04W 68/00 455/458 |
| 2001/0012787 | A1* | 8/2001 | Wortham | H04W 68/005 455/552.1 |
| 2001/0015963 | A1* | 8/2001 | Tuomainen | H04W 52/0216 370/311 |
| 2003/0088695 | A1* | 5/2003 | Kwak | H04W 68/00 709/238 |
| 2003/0138086 | A1* | 7/2003 | Sinclair | H04M 3/2272 379/201.01 |
| 2005/0064880 | A1* | 3/2005 | Butler | H04L 1/0017 455/458 |
| 2006/0274780 | A1* | 12/2006 | Walsh | H04L 12/189 370/458 |
| 2007/0254653 | A1* | 11/2007 | Bultinck | H04W 48/18 455/435.1 |
| 2007/0254677 | A1* | 11/2007 | Venkitaraman | H04W 68/00 455/458 |
| 2007/0298725 | A1* | 12/2007 | Ryu | H04W 76/27 455/68 |
| 2008/0014882 | A1* | 1/2008 | Tsai, Jr. | H04W 68/00 455/187.1 |
| 2008/0153521 | A1 | 6/2008 | Benaouda et al. | |
| 2008/0309490 | A1* | 12/2008 | Honkanen | G06K 7/0008 340/572.1 |
| 2009/0149157 | A9* | 6/2009 | Gallagher | H04W 8/065 455/414.1 |
| 2009/0213762 | A1* | 8/2009 | Guo | H04W 68/12 370/254 |
| 2010/0130218 | A1* | 5/2010 | Zhang | H04W 48/12 455/450 |
| 2010/0173651 | A1* | 7/2010 | Park | H04W 68/02 455/458 |
| 2010/0272004 | A1 | 10/2010 | Maeda et al. | |
| 2010/0332680 | A1* | 12/2010 | Anderson | H04L 61/1511 709/245 |

FOREIGN PATENT DOCUMENTS

| | | |
|---|---|---|
| EP | 2265067 A1 | 12/2010 |
| JP | S63109620 A | 5/1988 |
| JP | H0697877 A | 4/1994 |
| JP | 2001309069 A | 11/2001 |
| JP | 2002314475 A | 10/2002 |
| JP | 2004129905 A | 4/2004 |
| JP | 2009535872 A | 10/2009 |
| TW | 201108806 A1 | 3/2011 |
| WO | WO9927717 A2 | 6/1999 |
| WO | 2006124550 A2 | 11/2006 |
| WO | 2007128642 A1 | 11/2007 |

OTHER PUBLICATIONS

Taiwan Search Report—TW099143505—TIPO—Sep. 4, 2013.
Huawei: "Network Improvement for Low Mobility", 3GPP TSG SA WG2 Meeting #76 TD S2-097565, Dec. 1, 2009, 4 Pages.

* cited by examiner

APPARATUS AND METHOD FOR NETWORK-INITIATED ATTACHMENT AND REGISTRATION-LESS PAGING

CLAIM OF PRIORITY UNDER 35 U.S.C. § 119

The present application for patent claims priority to Provisional Application No. 61/285,810 entitled "Network-Initiated Attached and Registration-Less Paging" filed Dec. 11, 2009, and assigned to the assignee hereof and hereby expressly incorporated by reference herein.

FIELD

This disclosure relates generally to apparatus and methods for registration in a wireless communication system. More particularly, the disclosure relates to network-initiated attachment and paging for mobile devices which are not currently registered in a mobile radio network.

BACKGROUND

A wireless network may carry a variety of communication sessions with widely different characteristics. For example, one characteristic is duty cycle, that is, the percentage of time that a mobile terminal is actually transmitting or receiving information. In many cases, mobile terminals may have a low duty cycle if the amount of data to be communicated over an extended time period is very low.

When a large number of mobile terminals in a wireless network desire connections, each with very low data traffic, network congestion may result. In one example, the connections may be requested for an extended time period. For example, network congestion may be costly or difficult due to the maintenance of large number of connections. For example, very low duty cycles on the mobile terminals may be necessary to achieve a long battery life.

SUMMARY

Disclosed is an apparatus and method for network-initiated attachment and registration-less paging. According to one aspect, a method for registration-less paging comprising establishing a mobile device identity for a mobile device in a wireless network; determining a time instance for the identified mobile device to listen to pages; and sending a page from the wireless network to the identified mobile device during the determined time instance.

According to another aspect, a method for a network-initiated attach procedure comprising receiving a request to attach a mobile device in a wireless network; generating a paging message based on the request to attach the mobile device; sending a paging indicator to a mobile device based on the paging message during a time instance based on an agreed rule; and accepting an attach procedure from the mobile device based on the paging indicator.

According to another aspect, an apparatus for registration-less paging comprising means for establishing a mobile device identity for a mobile device in a wireless network; means for determining a time instance for the identified mobile device to listen to pages; and means for sending a page from the wireless network to the identified mobile device during the determined time instance.

According to another aspect, an apparatus for a network-initiated attach procedure comprising means for receiving a request to attach a mobile device in a wireless network; means for generating a paging message based on the request to attach the mobile device; means for sending a paging indicator to a mobile device based on the paging message during a time instance based on an agreed rule; and means for accepting an attach procedure from the mobile device based on the paging indicator.

According to another aspect, an apparatus comprising a processor and a memory, the memory containing program code executable by the processor for performing the following: establishing a mobile device identity for a mobile device in a wireless network; determining a time instance for the identified mobile device to listen to pages; and sending a page from the wireless network to the identified mobile device during the determined time instance.

According to another aspect, an apparatus comprising a processor and a memory, the memory containing program code executable by the processor for performing the following: receiving a request to attach a mobile device in a wireless network; generating a paging message based on the request to attach the mobile device; sending a paging indicator to a mobile device based on the paging message during a time instance based on an agreed rule; and accepting an attach procedure from the mobile device based on the paging indicator.

According to another aspect, a computer program product, comprising a computer-readable medium comprising codes for causing a computer to establish a mobile device identity for a mobile device in a wireless network; codes for causing the computer to determine a time instance for the identified mobile device to listen to pages; and codes for causing the computer to send a page from the wireless network to the identified mobile device during the determined time instance.

According to another aspect, a computer program product, comprising a computer-readable medium comprising codes for causing a computer to receive a request to attach a mobile device in a wireless network; codes for causing the computer to generate a paging message based on the request to attach the mobile device; codes for causing the computer to send a paging indicator to a mobile device based on the paging message during a time instance based on an agreed rule; and codes for causing the computer to accept an attach procedure from the mobile device based on the paging indicator.

Advantages of the present disclosure may include allowing a large number of very low duty cycle mobile devices to be connected to a wireless network whenever the wireless network detects a need for data transfer between a mobile device and the wireless network.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
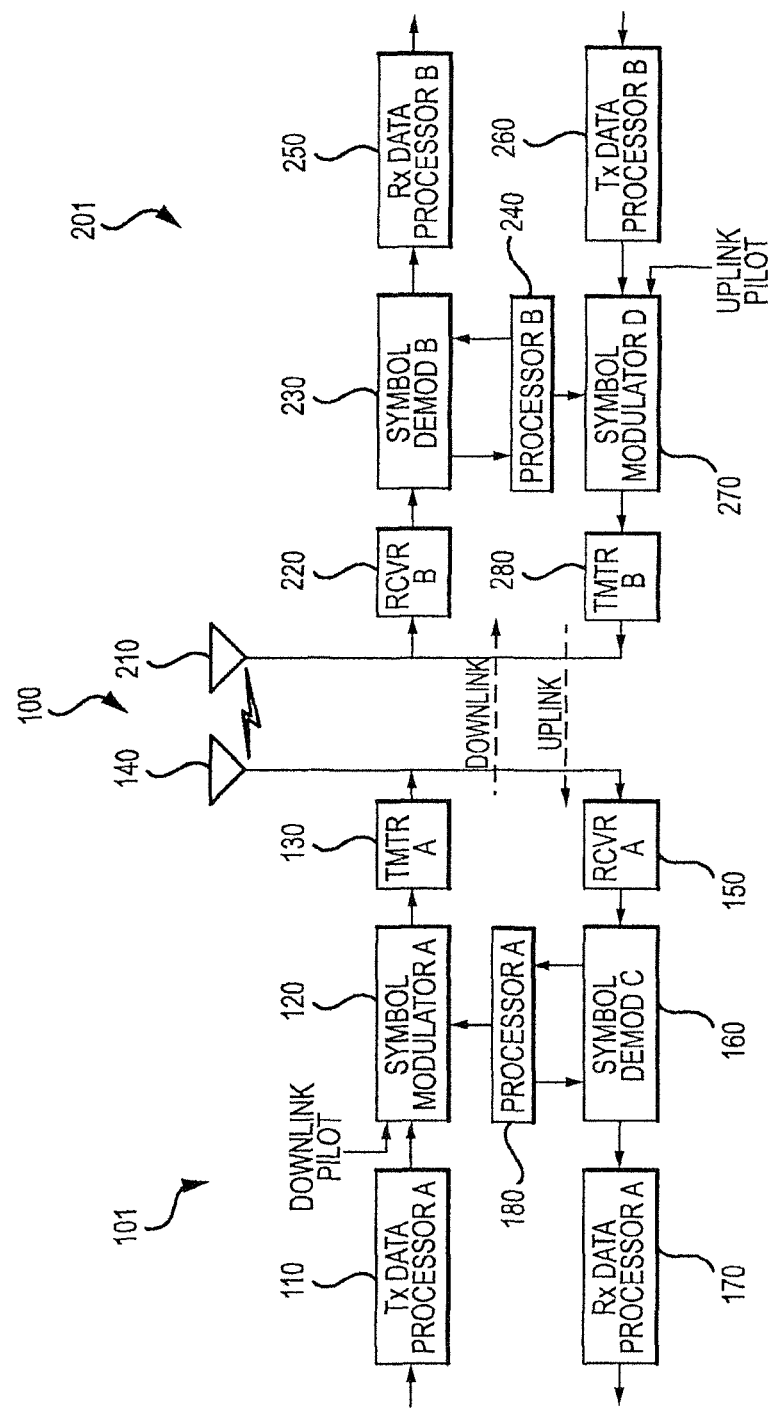
FIG. 1 is a block diagram illustrating an example of an access node/user equipment (UE) system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 is a block diagram illustrating an example of an access node/user equipment (UE) system 100. One skilled in the art would understand that the example access node/UE system 100 illustrated in FIG. 1 may be implemented in a frequency division multiple access (FDMA) environment, an orthogonal frequency division multiple access (OFDMA) environment, a code division multiple access (CDMA) environment, a wideband code division multiple access (WCDMA) environment, a time division (TDMA) environment, a spatial division multiple access (SDMA) environment, or any other suitable wireless environment.

The access node/UE system 100 includes an access node 101 (e.g., base station) and a user equipment or UE 201 (e.g., wireless communication device or mobile station). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
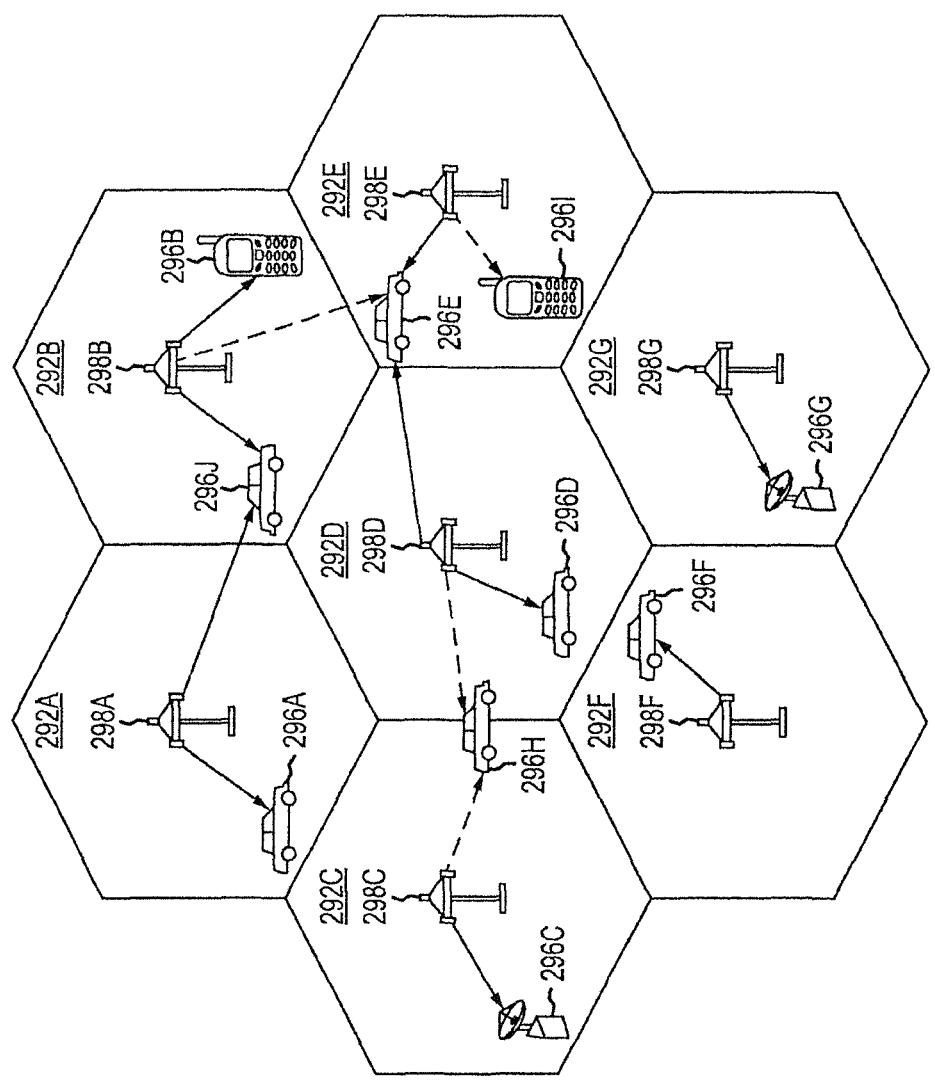
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, the present disclosure proposes a technique by which a very large number of mobile terminals, also known as mobile devices, may be attached to a wireless network in a network initiated manner. In one example, the mobile devices maintain very low duty cycle traffic and are mostly stationary. In one aspect, instead of being attached to the wireless network over a long period of time, a technique disclosed in the present disclosure employs a single attachment step, the establishment of a long term identifier (LTID) for the mobile device, and the storage of the coverage area, or set of sectors, in which the mobile device is located. Subsequently, the mobile device can completely detach itself from the wireless network and begin listening to paging indicators which are positioned in time slots, or time instances, that are a function of the LTID.

The present disclosure describes a process for initiating the attachment of a mobile device from the wireless network side. Also disclosed is a mechanism for paging of mobile devices that are currently not registered in a radio access network or a core network of a wireless network. A potential advantage is that a large number of very low duty cycle mobile devices may be connected to a wireless network whenever the wireless network detects a need for data transfer between the mobile device and the wireless network.

In one example, for some applications using machine-to-machine (M2M) communications it is expected that a very large number of mobile devices may have to be connected to the wireless network with each mobile device generating data traffic with a fairly low duty cycle. One skilled in the art would understand that an example of a M2M device is a mobile device. In one aspect, mobile devices used for M2M applications are known as M2M devices. Examples for such applications include smart meters, building monitoring and safety systems, smart vending machines, eHealth for disease management, remote monitoring of industrial machines or installations or M2M applications that rely on battery powered mobile devices without frequent recharging. If a large number of such M2M devices need to stay connected, for example attach to the wireless network once and stay attached, for extended periods of time, it may be too costly or even impossible in wireless systems due to the very large number of connections (i.e. attached mobile devices) that need to be maintained. In addition, the mobile device, or M2M device, may need to operate at an extremely low duty cycle to ensure a very long battery life.

In one aspect, for such applications it would be desirable to have a mechanism by which the wireless network itself could initiate an attachment of a specific M2M device or a group of M2M devices when there is need to exchange information with the addressed M2M device or group of M2M devices. Whenever a M2M application running on the wireless network side or a M2M application running on a M2M device needs to communicate with another M2M device or a group of M2M devices, the wireless network could then initiate an attachment of the requested M2M devices without need to stay connected all the time.

In one aspect, to minimize the impact of maintaining context information in the wireless network and performing required periodic procedures to maintain registration in the wireless network, a wireless network-initiated attachment procedure may work with M2M devices that are not registered in the wireless network. Therefore, in one example, a registration-less paging method would enable an efficient use of wireless network-initiated attachment procedures.

In one aspect, if a very large number of M2M devices with very low duty cycles require service while they are stationary or remaining in the same coverage area (i.e. they stay in the coverage area of the same cell or a set of cells), it may be difficult to keep all of the M2M devices registered all the time. For example, possible bottlenecks may include one or more of the following:

Consumption of storage & processing resources in the wireless network: In one example, being registered implies that certain context information must be stored and maintained in the wireless network which may not be acceptable depending on the number of deployed devices. If a very large number of such M2M devices exist, there could be significant complexity and cost to maintain all information within the wireless network and ensure the information is sufficiently up-to-date.

Consumption of radio resources: In another example, if a very large number of M2M devices are registered in the wireless network, significant radio resources may be consumed even when no information needs to be transferred between them and the wireless network. For example, possible issues may include need for reporting of neighboring cells or reporting of events that might have to be configured in a wireless network, periodic updates of the location or registration areas, etc.

Consumption of processing/battery resources at the device: In another example, existing procedures for registered M2M devices may cause infeasible resource consumption (e.g. battery energy consumption) within the M2M device which may be avoided by registration-less paging. A registered M2M device may be constrained to perform certain periodic tasks such as listening to possible pages or reporting periodic measurements or events with a maximum period that might not be feasible for some M2M applications.

In one aspect, one way of servicing many low duty cycle M2M devices performs some form of a low duty cycle registration procedure, which may, in one example, follow one or more of the following steps:

Perform a regular access procedure
Register at the network (e.g., attach)
Establish a data connection (e.g., packet data protocol (PDP) context)
Poll the server (or service layer) that may have data for the M2M device
If nothing needs to be done, tear down the connection
Un-register with the network
Go to sleep and redo the procedure later In one example, a low duty cycle registration procedure may have negative impacts. From a wireless network side, negative impacts may result if many M2M devices are performing the low duty cycle registration procedure which results in a fairly large overhead for the actual registration procedure compared to the polling step. For example, the processing required for the registration on the wireless network side may be much more than the actual processing for the polling of the server. For example, if the M2M device just wants to ask the server "Is there something for me?", the server should simply answer with a "yes" or "no". This example results in a small amount of information compared to what is transferred and processed for a full registration, setting up of a connection, etc.

Moreover, if the polling results in a low demand for actual data transfer, there may be a large waste of resources. In one example, the polling interval may be dimensioned to be significantly shorter than the expected time between events that would trigger the need for data transfer. For example, it may be assumed that less than half of the polls may actually result in some data exchange. If a very large number of M2M devices perform this type of low duty cycle registration procedure, a large waste of capacity may result.

On the device side, the device may need to perform expensive procedures, such as attach, even when there is no data traffic. In this case, the battery impact for each of the attach cycles would be much more significant than an appropriate paging.

Regarding Entity to Poll, if there is not a single server or a central service layer for determining whether there is a need for action (e.g., transfer of information), it may be difficult to determine which location is the right point to poll. For example, there may be multiple potential entities that a M2M device would have to poll in case it goes through periodic low duty cycle registration.

With the potential negative impacts, a periodic low duty cycle registration and polling procedure does not solve the problem of servicing many low duty cycle M2M devices in a wireless network.

In one aspect, to minimize the M2M device context that needs to be maintained in the wireless network and at the same time allow for very long paging cycles without need of M2M devices to be registered, one solution to this need may include a wireless network-initiated attach procedure associated with a registration-less paging.

In one aspect, registration-less paging refers to paging a mobile terminal, e.g. M2M device, which is not registered in a wireless network. For example, no registration in the wireless network results in the wireless network not having any context information about the mobile terminal. Context information may be location information about the mobile terminal, which may be used to find the mobile terminal as needed for paging. In another aspect, an outside user, for example a server application connected to the Internet or a middleware platform, may request a page of a wireless terminal at a specific area. Registration-less paging of the mobile terminal may include a pre-defined rule for a listen time when the mobile terminal should listen to such paging requests. In one example, the mobile terminal wakes up at the listen time to receive the paging request.

Figure 3:
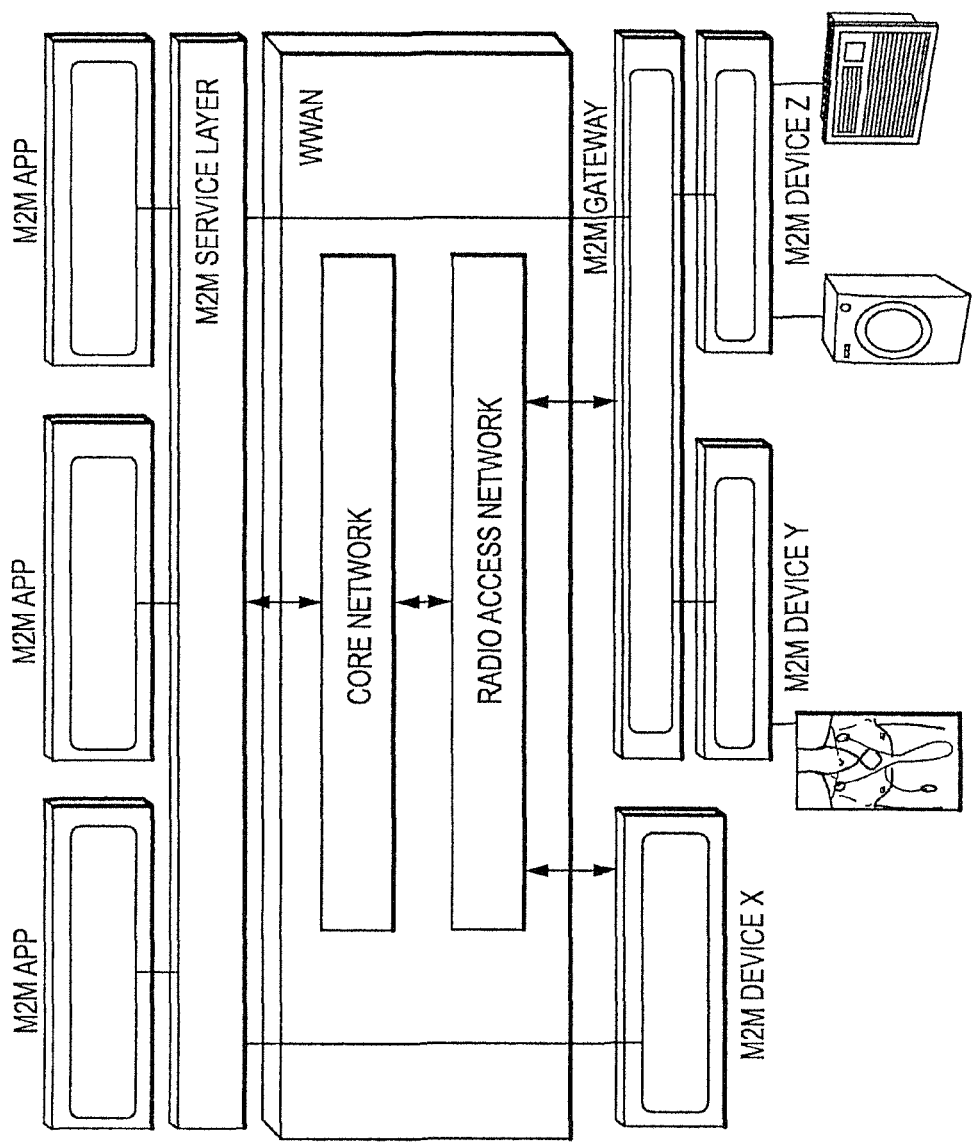
FIG. 3 illustrates an example of a high level M2M architecture with several attached M2M devices.

FIG. 3 illustrates an example of a high level M2M architecture with several attached M2M devices. In one aspect, a high level M2M architecture uses a M2M service layer on the wireless network side to communicate with a core network of a wireless system as illustrated in FIG. 3. A number of M2M applications (shown on top in FIG. 3) communicate with a M2M service layer (shown as a box below the M2M applications) to provide functionality to exchange information with M2M devices (shown at the bottom in FIG. 3). In one example, if the M2M devices use a wireless wide area network (WWAN) to connect to the M2M service layer, the M2M devices may use the available radio access technology of the WWAN to communicate. For a wireless network-initiated attach procedure in this context, a M2M application sitting on top of the M2M service layer or a M2M application running on one of the M2M devices may request the M2M service layer to establish an exchange of information between the requesting M2M application and a specific M2M device or a group of M2M devices.

In one aspect, the M2M service layer may contact the core network of the underlying wireless network, e.g., WWAN, to connect to the addressed M2M device. For example, if the M2M device is currently not attached to the network, it would establish the attachment. For example, if the addressed M2M device is not registered to the WWAN, it may use a paging mechanism to get hold of the requested M2M device.

In one example, the wireless network-initiated attach procedure may be triggered by a special message from the M2M service layer on the wireless network side or by a normal domain name system (DNS) query. In one aspect, the wireless network does not have the normal context information for the M2M device which is addressed by the M2M service layer and therefore a special paging message may be introduced. In one example, the wireless network-initiated attach procedure may operate as follows:

The request to attach an M2M device arrives at a paging agent on the core network side (e.g. serving GPRS support node/mobility management entity (SGSN/MME)) either through the M2M service layer or through the DNS system.

The paging agent generates a paging message which is similar to paging messages used in WWANs but it includes a long term ID which is not allocated by the wireless network itself (e.g. fully qualified domain name (FQDN) or a long term ID (LTID) that was established during a first contact between M2M device and service layer).

The M2M device knows by means of an agreed rule how to determine the time instances at which it is supposed to listen to paging indicators (either on the existing paging channels or on new ones) as a function of the FQDN or long term ID.

When the M2M device detects it is paged by the wireless network, it starts a normal attach procedure.

In one aspect, the disclosed approach allows reducing the context that needs to be kept by the wireless network for an M2M device which is not registered to the wireless network to almost zero, beside the allocation of the fully qualified domain name (FQDN) or long term identifier (LTID) plus the cell or group of cells in which the paging needs to occur. Alternatively, for cases where being registered in a wireless network, e.g. WWAN, is feasible or necessary, the wireless network-initiated attach procedure may also use the existing paging mechanisms for devices that are already registered but not attached.

In one aspect, the disclosed approach contains a new paging mechanism which may be used to page M2M devices that are currently not registered in the wireless network, but for which a long term ID (LTID) has been established already. In one example, the disclosed approach may be coupled with the flexibility to allow for very long paging cycles to enable long battery life on the M2M device side.

In one example, a registration-less paging procedure may include one or more of the following steps:

Perform a normal registration, set up a connection to the M2M service layer, establish an identity (e.g., long term ID) for a M2M device.

Indicate to the wireless network (i.e. to the core network) that the M2M device which just established its long term ID with the M2M service layer is of the special type that can use the new paging mechanism. And, the core network records the cell or a set of cells that comprise the coverage area of the M2M device and maps this coverage area to the established long-term ID of the M2M device. In one aspect, this information is the small context that is maintained in the wireless network. In another example, it may also be defined that this context is kept static (i.e., not updated) until requested by the M2M device (e.g. when M2M device is moved from one place to another).

Tear down connection and de-register

Use the long term ID of the M2M device to determine the time instances when the M2M device listens to pages. The actual mechanism in the radio access network by which the pages are sent may be the existing ones (i.e. use existing paging channels including paging indicators) or new ones (different paging channels, with no or different paging indicators).

When the wireless network needs to send a page to the M2M device, it uses the new paging occasions based on the M2M device long term ID.

When the M2M device detects a valid page for this M2M device during the newly defined paging occasions, it may receive some paging data (e.g. paging message) with this page. The paging data may be a short data packet from a M2M application (e.g. user data) or it may be special data for triggering further action. One option for the special data, in one example, is sending a command to initiate a regular attach procedure from the M2M device side.

In another aspect, the proposed solutions are also applicable to M2M systems which do not use a M2M service layer. The proposed solutions could also be used in M2M systems where a M2M server desires to reach a M2M device through the wireless network, e.g., WWAN. In one example, the M2M server would just need to be able to send a request for a wireless network-initiated attach from the core network of the wireless network. Furthermore, in another example, the concept could also be extended to initiating attachment of groups of M2M devices by the wireless network.

Figure 4:
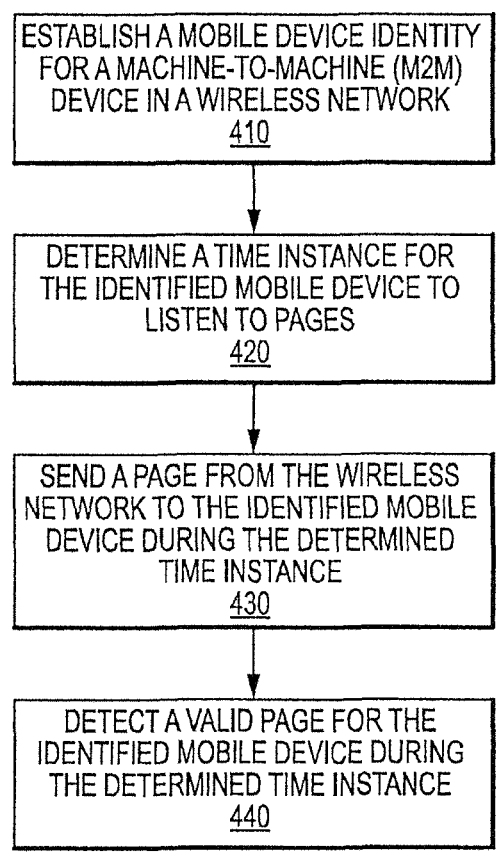
FIG. 4 illustrates a first example of a flow diagram for registration-less paging.

FIG. 4 illustrates a first example of a flow diagram for registration-less paging. In block 410, establish a mobile device identity for a machine-to-machine (M2M) device in a wireless network. In block 420, determine a time instance for the identified mobile device to listen to pages. In block 430, send a page from the wireless network to the identified mobile device during the determined time instance. In one aspect, in block 440, the mobile device detects a valid page for the identified mobile device during the determined time instance.

Figure 5:
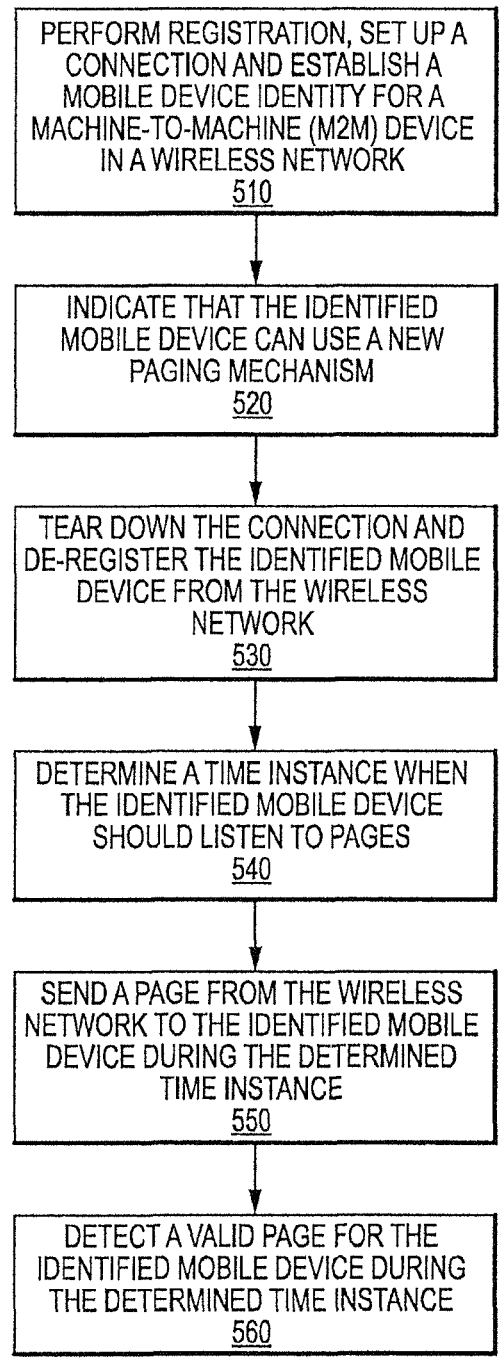
FIG. 5 illustrates a second example of a flow diagram for registration-less paging.

FIG. 5 illustrates a second example of a flow diagram for registration-less paging. In block 510, perform registration, set up a connection and establish a mobile device identity for a machine-to-machine (M2M) device in a wireless network. In one example, the connection is set up with a M2M service layer. In another example, the device identity for a M2M device (i.e., M2M device identity) is a long term ID (LTID). In block 520, indicate that the identified mobile device can use a new paging mechanism. In one example, the indication is made to a core network within the wireless network. In block 530, tear down the connection and de-register the identified mobile device from the wireless network. In block 540, determine a time instance when the identified mobile device should listen to pages. In one example, more than one time instance is determined. In one example, the determination uses the LTID of the M2M device. In block 550, send a page from the wireless network to the identified mobile device during the determined time instance. In one example, the determined time instance is based on the LTID. In one aspect, in block 560, the mobile device detects a valid page for the identified mobile device during the determined time instance. In one example, the detecting the valid page also includes receiving paging data, such as, user data or special data which triggers further action. For example, the special data may be a command which initiates a regular attach procedure from the M2M device side.

Figure 6:
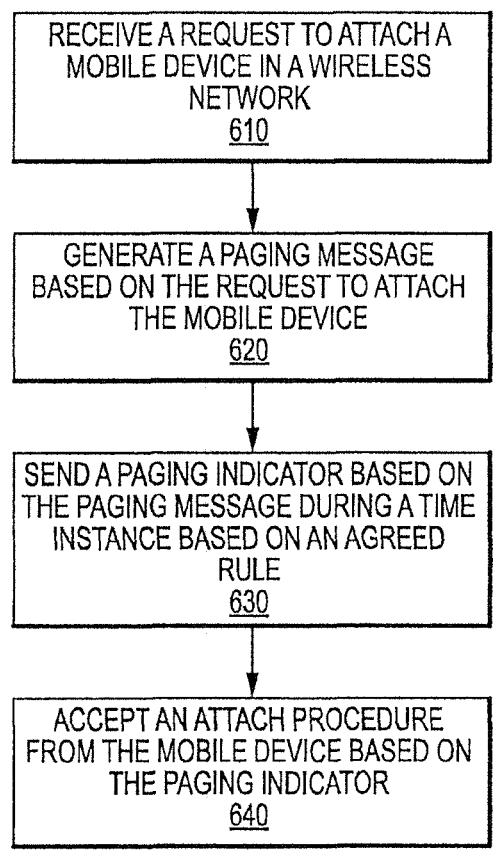
FIG. 6 illustrates an example of a flow diagram for a network-initiated attach procedure.

FIG. 6 illustrates an example of a flow diagram for a network-initiated attach procedure. In block 610, receive a request to attach a mobile device in a wireless network. In one example, the mobile device is a M2M device. In another example, the request arrives at a paging agent on a core network side. In another example, the request arrives through a M2M service layer or through a domain name system (DNS) system. In yet another example, the paging agent is a serving GPRS support node (SGSN) or mobile management entity (MME). In block 620, generate a paging message based on the request to attach the mobile device. In one example, the paging message includes a long term ID (LTID). In another example, the LTID is not allocated by the wireless network itself. In another example, the LTID is allocated as a fully qualified domain name (FQDN) or a long term ID (LTID) which was established during a first contact between the mobile device and service layer. In block 630, send a paging indicator based on the generated paging message during a time instance based on an agreed rule. In one example, more than one paging indicator is sent. In one example, one or more paging indicator is sent during one or more time instances. In one example, the agreed rule is based on the FQDN or on the LTID. In block 640, accept an attach procedure from the mobile device based on the paging indicator. In one example, the attach procedure is triggered by detection of the paging indicators.

One skilled in the art would understand that the steps disclosed in the example flow diagrams in FIGS. 4, 5 and 6 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 7:
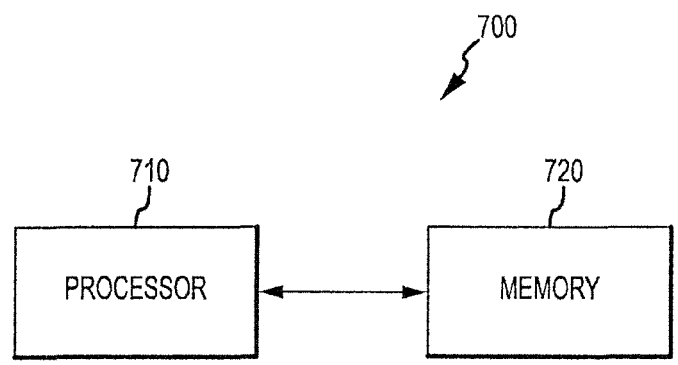
FIG. 7 illustrates an example of a device comprising a processor in communication with a memory for executing the processes for registration-less paging or for a network-initiated attach procedure.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 7 illustrates an example of a device 700 comprising a processor 710 in communication with a memory 720 for executing the processes for registration-less paging. In another example, the device 700 is also for executing the processes for a network-initiated attach procedure. In one example, the device 700 is used to implement the algorithms illustrated in FIGS. 4, 5, 6 and 11. In one aspect, the memory 720 is located within the processor 710. In another aspect, the memory 720 is external to the processor 710. In one aspect, the processor includes circuitry for implementing or performing the various flow diagrams, logical blocks and/or modules described herein.

Figure 8:
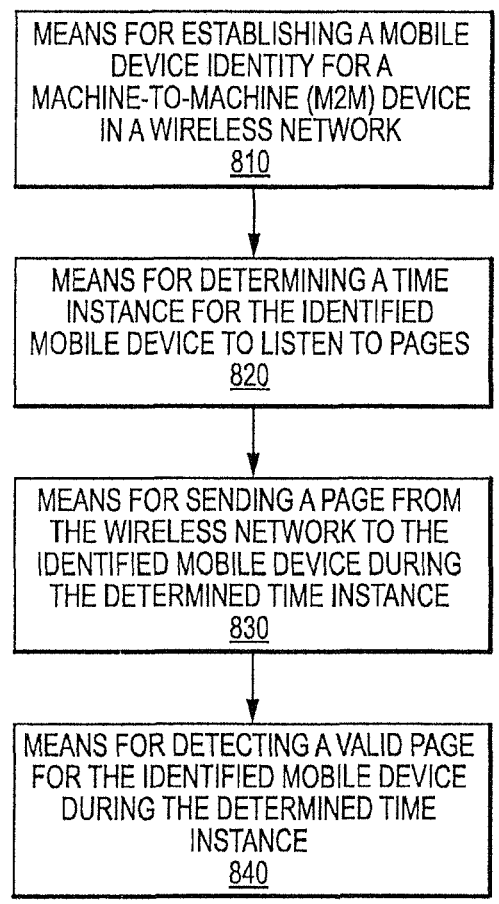
FIG. 8 illustrates a first example of a device suitable for registration-less paging.

FIG. 8 illustrates a first example of a device 800 suitable for registration-less paging. In one aspect, the device 800 is implemented by at least one processor comprising one or more modules configured to provide different aspects of registration-less paging as described herein in blocks 810, 820, 830 and 840. For example, each module comprises hardware, firmware, software, or any combination thereof. In one aspect, the device 800 is also implemented by at least one memory in communication with the at least one processor.

Figure 9:
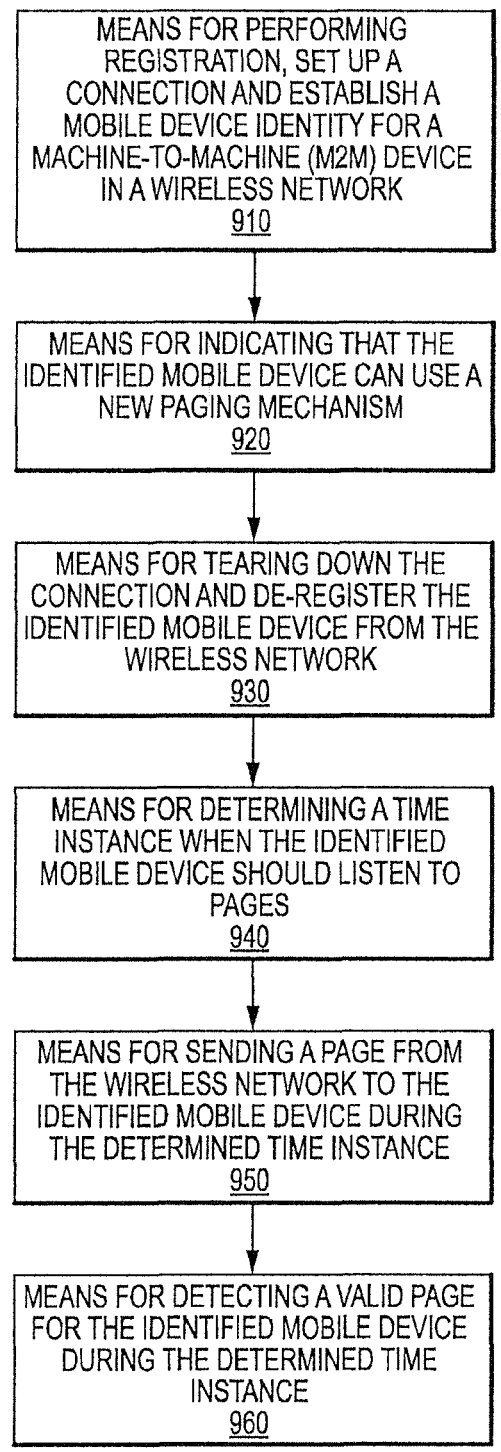
FIG. 9 illustrates a second example of a device suitable for registration-less paging.

FIG. 9 illustrates a second example of a device 900 suitable for registration-less paging. In one aspect, the device 900 is implemented by at least one processor comprising one or more modules configured to provide different aspects of registration-less paging as described herein in blocks 910, 920, 930, 940, 950 and 960. For example, each module comprises hardware, firmware, software, or any combination thereof. In one aspect, the device 900 is also implemented by at least one memory in communication with the at least one processor.

Figure 10:
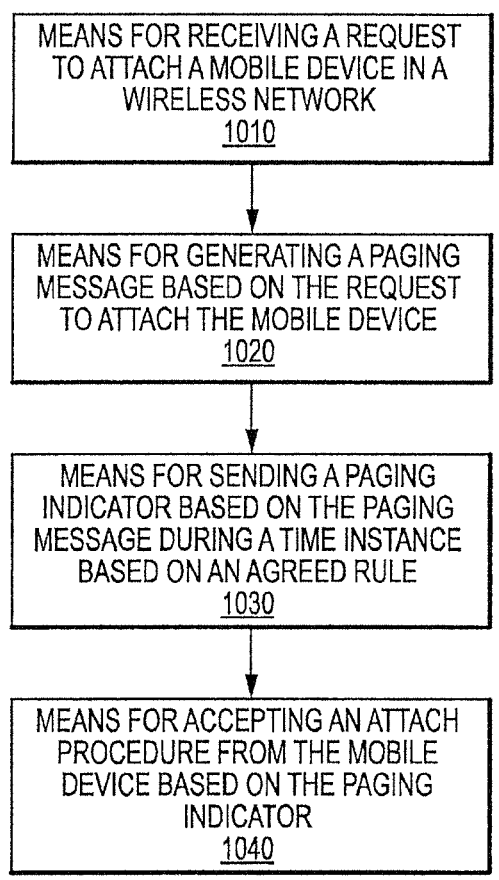
FIG. 10 illustrates an example of a device suitable for a network-initiated attach procedure.

FIG. 10 illustrates an example of a device 1000 suitable for a network-initiated attach procedure. In one aspect, the device 1000 is implemented by at least one processor comprising one or more modules configured to provide different aspects of a network-initiated attach procedure as described herein in blocks 1010, 1020, 1030 and 1040. For example, each module comprises hardware, firmware, software, or any combination thereof. In one aspect, the device 1000 is also implemented by at least one memory in communication with the at least one processor.

Figure 11:
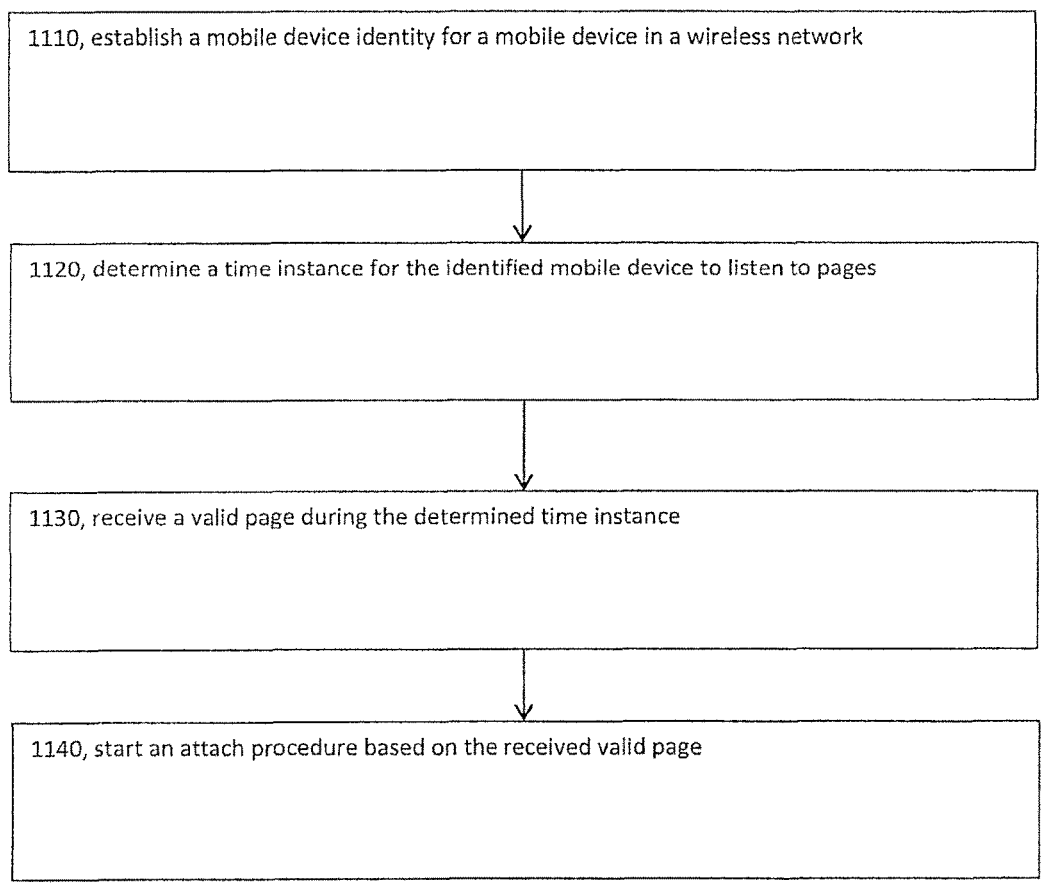
FIG. 11 illustrates an example of a flow diagram for registration-less paging from a mobile device perspective.

FIG. 11 illustrates an example of a flow diagram for registration-less paging from a mobile device perspective. In block 1110, establish a mobile device identity for a mobile device in a wireless network. In block 1120, determine a time instance for the identified mobile device to listen to pages. In block 1130, receive a valid page during the determined time instance. In block 1140, start an attach procedure based on the received valid page. In one aspect, the step in block 1140 is optional.

Figure 12:
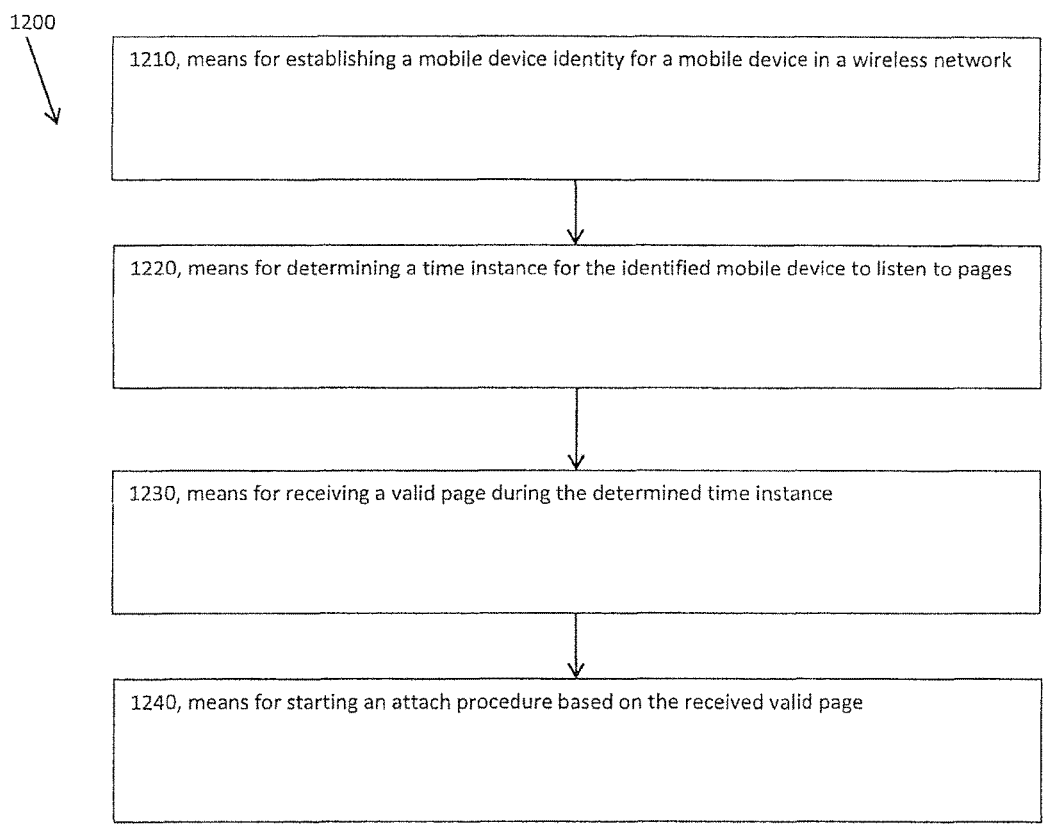
FIG. 12 illustrates an example of device for implementing registration-less paging from a mobile device perspective.

FIG. 12 illustrates an example of device 1200 for implementing registration-less paging from a mobile device perspective. In one aspect, the device 1200 is implemented by at least one processor comprising one or more modules configured to provide registration-less paging from a mobile device perspective as described herein in blocks 1210, 1220, 1230 and 1240. For example, each module comprises hardware, firmware, software, or any combination thereof. In one aspect, the device 1200 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for registration-less paging by a mobile device in a wireless network, the method comprising:
   determining, based on a mobile device identity, a time instance for the mobile device to listen to pages, the mobile device identity established during a first contact between the mobile device and the wireless network, the mobile device having been disconnected and de-registered from the wireless network after the first contact;
   listening for a registration-less page from the wireless network during the determined time instance; and
   initiating attachment of the mobile device when the registration-less page is received from the wireless network during the determined time instance.

2. The method of claim 1, further comprising establishing the mobile device identity by performing a registration and setting up a connection for the mobile device during the first contact.

3. The method of claim 2, further comprising indicating that the mobile device can use a new paging mechanism.

4. The method of claim 1, wherein the mobile device identity is a long term ID (LTID).

5. The method of claim 4, wherein the time instance is a function of the LTD.

6. The method of claim 1, the registration-less page further comprising paging data.

7. The method of claim 6, wherein the paging data comprises one or more of the following: user data or a special data which triggers at least one further action.

8. The method of claim 7, wherein the special data is a command for initiating an attachment procedure.

9. A method for a wireless network to perform a network-initiated attach procedure for a mobile device, comprising:
   receiving a request to attach the mobile device in the wireless network;
   generating a registration-less paging message based on the request to attach the mobile device, the registration-less paging message including a paging indicator comprising user data or special data for triggering further action by the mobile device;
   transmitting the registration-less paging message to the mobile device during a time instance, the time instance being determined based on a mobile device identity established during a first contact between the mobile device and the wireless network, the mobile device having been disconnected and de-registered from the wireless network after the first contact; and
   accepting an attach procedure from the mobile device based on the paging indicator.

10. The method of claim 9, wherein the request arrives at a paging agent on a core network side of the wireless network.

11. The method of claim 10, wherein the paging agent is a serving GPRS support node (SGSN) or mobile management entity (MME).

12. The method of claim 9, wherein the request arrives through a machine-to-machine (M2M) service layer or through a domain name system (DNS) system of the wireless network.

13. The method of claim 9, wherein the registration-less paging message comprises a long term ID (LTID).

14. The method of claim 13, wherein the LTD is not allocated by the wireless network.

15. An apparatus for registration-less paging by a mobile device in a wireless network, the method comprising:
   means for determining, based on a mobile device identity, a time instance for the mobile device to listen to pages, the mobile device identity established during a first contact between the mobile device and the wireless network, the mobile device having been disconnected and de-registered from the wireless network after the first contact;
   means for listening for a registration-less page from the wireless network during the determined time instance; and
   means for initiating attachment of the mobile device when the registration-less page is received from the wireless network during the determined time instance.

16. The apparatus of claim 15, further comprising means for establishing the mobile device identity by performing a registration and setting up a connection for the mobile device during the first contact.

17. The apparatus of claim 16, further comprising means for indicating that the mobile device can use a new paging mechanism.

18. The apparatus of claim 15, wherein the mobile device identity is a long term ID (LTID).

19. The apparatus of claim 18, wherein the time instance is a function of the LTD.

20. The apparatus of claim 15, wherein the registration-less page further comprising paging data.

21. The apparatus of claim 20, wherein the paging data comprises one or more of the following: user data or a special data which triggers at least one further action.

22. The apparatus of claim 21, wherein the special data is a command for the means for initiating attachment of the mobile device to initiate an attachment procedure.

23. An apparatus for performing a network-initiated attach procedure, the apparatus comprising:
   means for receiving a request to attach a mobile device in a wireless network;
   means for generating a registration-less paging message based on the request to attach the mobile device, the registration-less paging message including a paging indicator comprising user data or special data for triggering further action by the mobile device;
   means for transmitting the registration-less paging message to the mobile device based on the paging message during a time instance, the time instance being determined based on a mobile device identity established during a first contact between the mobile device and the wireless network, the mobile device having been disconnected and de-registered from the wireless network after the first contact; and
   means for accepting an attach procedure from the mobile device based on the paging indicator.

24. The apparatus of claim 23, wherein the request arrives at a paging agent on a core network side of the wireless network.

25. The apparatus of claim 24, wherein the paging agent is a serving GPRS support node (SGSN) or mobile management entity (MME).

26. The apparatus of claim 23, wherein the request arrives through a machine-to-machine (M2M) service layer or through a domain name system (DNS) system of the wireless network.

27. The apparatus of claim 23, wherein the registration-less paging message includes a long term ID (LTID).

28. The apparatus of claim 27, wherein the LTD is not allocated by the wireless network.

29. An apparatus for wireless communication, comprising:
   a memory; and
   at least one processor coupled to the memory and configured to:
      determine, based on a mobile device identity of the apparatus, a time instance for the mobile device to listen to pages, the mobile device identity established during a first contact between the apparatus and a wireless network, the apparatus having been disconnected and de-registered from the wireless network after the first contact;
      listen for a registration-less page from the wireless network to the mobile device during the determined time instance; and
      initiate attachment of the apparatus when the registration-less page is received from the wireless network during the determined time instance.

30. The apparatus of claim 29, wherein the at least one processor if further configured to establish the mobile device identity by performing a registration and setting up a connection for the mobile device during the first contact.

31. The apparatus of claim 30, wherein the at least one processor is further configured to indicate that the mobile device can use a new paging mechanism.

32. The apparatus of claim 29, wherein the mobile device identity is a long term ID (LTID).

33. The apparatus of claim 32, wherein the time instance is a function of the LTD.

34. An apparatus for wireless communication, comprising:
   a memory; and
   at least one processor coupled to the memory and configured to:
      receive a request to attach a mobile device in a wireless network;
      generate a registration-less paging message based on the request to attach the mobile device, the registration-less paging message including a paging indicator comprising user data or special data for triggering further action by the mobile device;
      transmit the registration-less paging message to the mobile device based on the paging message during a time instance, the time instance being determined based on a mobile device identity established during a first contact between the mobile device and the wireless network, the mobile device having been disconnected and de-registered from the wireless network after the first contact; and
      accept an attach procedure from the mobile device based on the paging indicator.

35. The apparatus of claim 34, wherein the request arrives at a paging agent on a core network side of the wireless network.

36. The apparatus of claim 34, wherein the request arrives through a machine-to-machine (M2M) service layer or through a domain name system (DNS) system.

37. The apparatus of claim 34, wherein the registration-less paging message includes a long term ID (LTID).

38. The apparatus of claim 37, wherein the LTD is not allocated by the wireless network.

39. A non-transitory computer-readable medium storing computer executable code, comprising:

codes for causing the computer to determine, based on a mobile device identity of a mobile device, a time instance for the mobile device to listen to pages, the mobile device identity established during a first contact between the mobile device and a wireless network, the mobile device having been disconnected and de-registered from the wireless network after the first contact;

codes for causing the computer to listen for a registration-less page from the wireless network during the determined time instance; and code for causing the computer to initiate attachment of the mobile device when the registration-less page is received from the wireless network during the determined time instance.

40. A non-transitory computer-readable medium storing computer executable code, comprising:

codes for causing a computer to receive a request to attach a mobile device in a wireless network;

codes for causing the computer to generate a registration-less paging message based on the request to attach the mobile device, the registration-less paging message including a paging indicator comprising user data or special data for triggering further action by the mobile device;

codes for causing the computer to transmit the registration-less paging message to the mobile device based on the paging message during a time instance, the time instance being determined based on a mobile device identity established during a first contact between the mobile device and the wireless network, the mobile device having been disconnected and de-registered from the wireless network after the first contact; and codes for causing the computer to accept an attach procedure from the mobile device based on the paging indicator.

\* \* \* \* \*